April 18, 1961  R. D. GOODENOUGH ET AL  2,980,499
RECOVERY OF LITHIUM FROM LITHIUM BEARING ORES
Filed Jan. 29, 1957
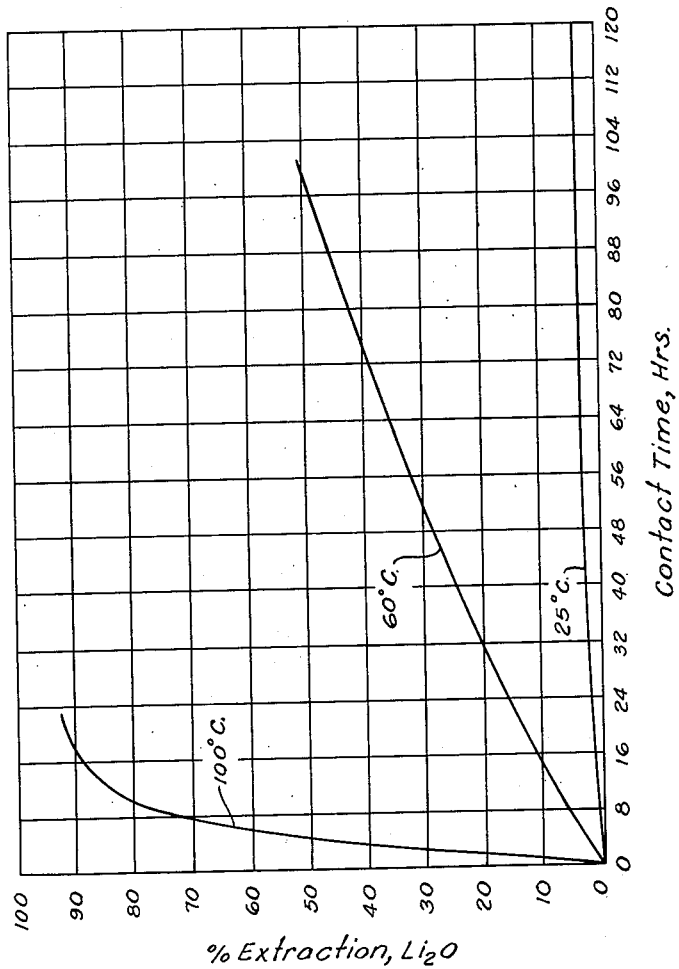
INVENTORS.
Robert D. Goodenough
Vernon A. Stenger
BY
Griswold & Burdick
ATTORNEYS

United States Patent Office 2,980,499
Patented Apr. 18, 1961

2,980,499

RECOVERY OF LITHIUM FROM LITHIUM BEARING ORES

Robert D. Goodenough and Vernon A. Stenger, Midland, Mich., assignors to The Dow Chemical Company, Midland, Mich., a corporation of Delaware Filed Jan. 29, 1957, Ser. No. 636,954

2 Claims. (Cl. 23—32)

This invention relates to an improved process for the recovery of lithium from lithium bearing ores, and more particularly, to a process for the recovery of lithium from ores which contain lithium in an acid-soluble form by contacting the ore with a cation exchange resin.

The production of lithium is mainly limited to the recovery of the metal from spodumene, lepidolite, and other natural deposits. The lithium content in these deposits is relatively small and chemically combined so that expensive processing is necessary to recover the metal. The ore is generally ground, heated to high temperatures with an acid or other reactants to convert the lithium to a soluble salt or base, and then leached. Lithium bearing ores contain aluminum, potassium, and other constituents which during the calcining step also react with the reactant added to convert the lithium to a soluble salt or base. Many of these constituents form soluble salts which are leached from the ore with the lithium salt. Thus, it requires the use of a large amount of acid or other reactants to convert the relatively small amount of lithium to a leachable salt and furthermore a difficult separation of the lithium from the other soluble constituents in the leached solution must be made. A process by which the lithium could be recovered from lithium bearing ore in a relatively pure solution and without the use of acids would greatly decrease the cost and simplify the recovery of lithium.

In a co-pending application of co-workers of the inventors of the instant application, R. M. Wheaton and R. J. Anderson, Serial Number 636,870, filed January 29, 1957, a process is disclosed whereby lithium is recovered from lithium bearing ores by contacting the ore with a strongly acidic cation exchange resin at room temperature. While the process is effective, further and significant improvement has now been found possible, enabling material increase in the percentage of lithium recovered from the ores.

It is, therefore, a principal object of this invention to provide an improved process for the recovery of lithium from lithium bearing ores with a cation exchange resin where a high percentage of the lithium may be removed from the ore.

The above and other objects may be accomplished by contacting the ore, in the presence of water, with a strongly acidic cation exchange resin in the acid form at a tempreature in the range of 95° to 150° C. to obtain an ion exchange of the lithium in the ore to the ion exchange resin, separating the resin from the contacting ore, and recovering the lithium from the resin.

It has been discovered that when lithium bearing ores which contain lithium in an acid soluble state are contacted with a strongly acidic cation exchange resin at a termperature in the range of 95° to 150° C., an unexpectedly high rate and high percentage of recovery of the lithium is obtained from the ore. The attached figure illustrates this unusual increase in rate and recovery. In the figure, the abscissa represents the time in hours and the ordinate represents the percent of lithium transferred from the ore to the resin. The curves indicate the amount of lithium transferred from the ore to the resin as a function of time for the different temperatures. The details and data upon which the curves are based are given in Example I below. It can be seen from the curves that in a contact time of 20 hours over 90 percent of the lithium was recovered at 100° C., around 13 percent at 60° C., and 1 percent at 25° C. Since in usual ion exchange reactions only a slight increase in rate of ion exchange will be obtained with an increase in temperature, it would be expected that the same effect would be true for the lithium ore and the resin. The magnitude of the increase in rate obtained indicates that the temperature has an unusual effect upon this particular ion exchange reaction.

In the process, the lithium bearing ore is ground to 100–200 mesh and mixed with a strongly acidic cation exchange resin and water at a temperature in the range of 95° C. to 150° C. and under sufficient pressure to maintain the water in liquid phase. When the ore is contacted with the resin, the lithium ions from the ore will replace the hydrogen ions on the resin. Stirring of the mixture during this period is preferred so that a good contact between the resin and the ore can be obtained. After the ion exchange has taken place, the resin is separated from the ore by known methods, such as vigorous backwashing or screening. The ore is generally ground to a smaller particle size than the resin, which aids in the separation. The separated resin is then eluted with an acid, such as sulfuric, nitric, hydrobromic, hydriodic, and hydrochloric, which will convert the lithium to a soluble lithium salt and replace the hydrogen ions on the resin. If it is preferred to obtain the lithium as lithium hydroxide, the resin may be eluted with a hydroxide, such as sodium hydroxide, potassium hydroxide, and calcium hydroxide. When a hydroxide is used, the resin must be contacted with an acid to place the resin in the acid form before it can be reused.

The lithium bearing ores which may be used for the recovery of lithium by this process are the type which have the lithium in an acid soluble form, such as lepidolite, beta-spodumene, and amblygonite. Some lithium bearing ores may not have the lithium in a soluble form in the natural state, but may be converted to the desirable form by heating the ore to a high temperature. For example, spodumene in its natural state is in the alpha form which has the lithium bound in an acid insoluble form. Upon heating the spodumene to a temperature around 1000° C. it will be converted to beta-spodumene in which the lithium is acid leachable.

While lepidolite in its natural state has lithium in a leachable form, the rate of exchange of lithium from the ore to the resin is greatly increased when lepidolite is first calcined at a temperature below the fusion point in the range of 850° to 1200° C. By calcining the ore, the structure of the lepidolite is changed to a form more favorable for the exchange of lithium. When natural lepidolite is contacted for six hours at 100° C. with the resin, around 24 percent of the lithium will be transferred to the resin. By first calcining the ore to a temperature of around 1000° C. the rate of exchange increases so that around 88 percent of the lithium may be exchanged under the same conditions.

The resins which may be used in the process are the strongly acidic cation exchange resins. For example, the sulfonic type cation exchange resins as described in U.S. Patent Numbers 2,597,438, 2,500,149, and 2,366,007 may be used.

The rate at which the lithium will be replaced from the ore to the resin depends upon the conditions of the resin. Ion exchange resins have a fixed capacity for the exchange of ions, and as this capacity is utilized, the rate of ion exchange decreases. Thus, the most rapid rate is obtained with freshly reactivated resin and as the resin is being used the rate progressively diminishes. In order to obtain substantially complete replacement of the lithium from a given amount of ore to the ion exchange resin in the shortest time, an excess of resin would be used so that only a part of the ion exchange capacity of the resin is utilized and a high rate of ion exchange obtained. Since in the process, it is necessary to elute the lithium from the resin, the same effect is experienced here. The rate at which the lithium is released from the resin when it is contacted with the acid, will likewise depend upon the amount of lithium that the resin contains. The lithium may be rapidly and easily recovered from resin which contains a high percentage of lithium and as the lithium ions on the resin are replaced by the hydrogen ions, the replacement of the lithium becomes more difficult and requires more drastic conditions. Thus, in the operation of the process, a wide ratio of the resin to the lithium bearing ore may be employed. When the amount of resin used has just enough capacity to bind all the lithium in the ore, a long time will be required to obtain substantially complete transfer of the lithium from the ore. When a large excess of the resin is used, the lithium will be replaced from the ore rapidly, but the recovery of lithium from the resin will be more difficult.

The ratio of resin to the lithium bearing ore which is generally employed is such that about 40 to 75 percent, preferably around 55 percent, of the total ion exchange capacity of the resin would be used if complete transfer of the lithium from the ore were obtained. With this ratio a rapid rate of transfer of lithium from the ore to the resin is obtained. Also, the lithium may be readily recovered from the resulting lithium bound resin by eluting the resin preferably with 2 to 4 N hydrochloric acid in a volumetric ratio of resin to acid in the range of 1:1 to 1:3.

It is desirable to operate at the highest possible temperature to take advantage of the increased rate of transfer of the lithium. Since the ion exchange resin will deteriorate rapidly at high temperatures, the temperature of the process is limited by the heat stability of the resin employed which is around 150° C. for the presently known resins. It is preferred to use a temperature in the range of 95° to 120° C. At these temperatures the resin may be used for considerable length of time without any apparent deterioration.

The contact time required to obtain the transfer of the major part of the lithium from the ore to the resin depends upon the temperature and the ore contacted. Generally, a contact time in the range of 1 to 25 hours is used. For some of the ores the rate of transfer of the lithium from the ore is slower than for other ores and thus a longer time is required to obtain the same recovery. For example, a contact time of 15 hours is required to replace 88 percent of the lithium from beta-spodumene, while for lepidolite which has been heated prior to contacting, 88 percent of the lithium may be recovered in around 6 hours. Thus, for beta-spodumene and uncalcined lepidolite a contact time in the range of 5 to 15 hours is preferred, while for prior heated lepidolite around 3 to 10 hours is preferred.

It is apparent to a person skilled in the art that the process of the invention may be practiced in batch or in a continuous manner to obtain the advantages of a continuous process. In continuous operation, a countercurrent contact may be obtained by using a moving bed of resin. Since the particles of the resin may be larger than the particles of the ore, the resin may be placed in a series of moving screen beds, which will retain the resin but allow the ore to pass through.

The following examples further illustrate the invention but are not to be construed as limiting the invention thereto.

Example I

A concentrate of alpha-spodumene, ground to 120 to 200 mesh, U.S. Sieve Series, was heated to 1020° C. for 1 hour to convert the alpha-spodumene to the beta form. The resulting beta-spodumene was cooled and 4.0 grams samples of the beta-spodumene containing about 6.13 weight percent of lithium oxide were placed in 250-ml. flasks with 50 ml. of water and 6.9 grams of a dry, strongly acidic sulphonic type cation exchange resin, such as described in U.S. Patent Number 2,366,007 and similar to the product sold by The Dow Chemical Company under the trademark "Dowex-50." The ion exchange resin was in the acid form. Ratio of ore to resin used was such that the molar lithium content of the ore to the lithium binding capacity of the resin was 0.52. The flasks were agitated, heated to 100° C., and refluxed for different periods of time. The resin was separated from the contacted beta-spodumene by screening and eluted with 20 ml. of 3 N hydrochloric acid. Effluent from the resin was analyzed by flame spectrophotometry for lithium and the percent of lithium recovery from the ore was calculated.

The results obtained are given below and plotted on the attached figure.

| Contact time, hours: | Percent recovery of lithium |
|---|---|
| 1 | 12.4 |
| 3 | 28.4 |
| 5 | 55.2 |
| 10 | 78.1 |
| 15 | 88 |
| 21½ | 90 |

To show the effect of temperature at temperatures below 100° C., two series of runs were made in the manner described above except that the amounts of beta-spodumene and resin were proportionally reduced. Samples of the beta-spodumene were of 1 gram and the amount of resin used for each sample was 1.7 grams which gave a molar ratio of lithium in the ore to the lithium binding capacity of the resin of 0.5:1. One of the series of runs was performed at 25° C. and the second at 60° C.

The results obtained for the series of runs at 25° C. are shown in the table below and are plotted in the attached figure.

| Contact time, hours: | Percent recovery of lithium |
|---|---|
| 24 | 1.2 |
| 72 | 2.1 |
| 120 | 2.6 |

The results obtained for the 60° C. runs which are also plotted on the attached figure are given below.

| Contact time, hours: | Percent recovery of lithium |
|---|---|
| 6 | 3.6 |
| 12 | 12.0 |
| 24 | 15.4 |
| 48 | 23.3 |
| 96 | 53.3 |

The ion exchange capacity of the resin used in the runs for 100°, 60°, and 25° C. was calculated from the sodium hydroxide titration data on the resin.

Example II

A series of runs was made using the procedure described in Example I, wherein the ratio of the resin was varied. The beta-spodumene was refluxed at 100° C. with the resin for a period of 5 hours. The resin was then separated from the ore and eluted with 20 ml. of 3 N hydrochloric acid. Effluent from the resin was analyzed for lithium and the percent of lithium recovery from the ore was calculated.

The results are shown in the table below:

| Contact time, Hours | Molar Ratio of Lithium in Ore to the Ion Exchange Capacity of the Resin | Percent Recovery of Lithium |
|---|---|---|
| 5 | 1:1 | 42.5 |
| 5 | 0.52:1 | 55.2 |
| 5 | 0.347:1 | 46.1 |
| 5 | 0.208:1 | 40.1 |

The ion exchange capacity of the resin was calculated from the sodium hydroxide titration data on the resin. It will be noted that when the ratio of the ore to the resin was increased so that the lithium in the ore represented about 55.5 percent of the lithium binding capacity of the resin, around 55 percent of the lithium was recovered. As the amount of resin was increased above the value, the amount of lithium recovered decreased. This decrease was probably due to the incomplete elution of the lithium from the ion exchange resin.

*Example III*

To show the effect of temperature, two runs were made in a manner described in Example I, except that the resin was contacted with the ore for a period of time of 2 hours and the temperatures used were 120° C. for one of the examples and 140° C. for the other.
The results obtained are shown below.

| Time, hours | Temperature, °C. | Percent Recovery of Lithium |
|---|---|---|
| 2 | 120 | 54.8 |
| 2 | 140 | 66.7 |

*Example IV*

Two runs were made under a similar procedure as described in Example I, except that lepidolite was used and the contact times of the resin with the lepidolite were 3 to 6 hours, respectively. In the 3 hour contact time 22 percent of the lithium from the ore was recovered and for the 6 hour contact period, 24 percent was recovered. The above procedure was repeated except that the lepidolite was first heated to 1000° C. for around ½ hour, cooled, and then contacted with the resin. In the 3 hour contact time 77.4 percent of the lithium was recovered and 87.5 percent in the 6 hour period.

It will be apparent from the detailed discussion and examples that the recovery of lithium may be unexpectedly increased by contacting the ore with a cation exchange resin at temperatures in the range of 95° to 150° C. Over 90 percent of the lithium may be recovered from the lithium bearing ore in relatively short contact time which makes this process commercially very attractive. By contacting the ore with the ion exchange resin under conditions of the invention, the lithium recovery from the ore is substantially the same as obtained with the processing where the ore is calcined with acid or other reactants and leached. The solutions of lithium obtained are free of other salts which are difficult to separate from the lithium which is not the case with the leached solution obtained after calcining the ore.

What is claimed is:

1. A process for the recovery of lithium values from solid lepidolite, which comprises heating the solid lepidolite at a temperature below the fusion point in the range of 850° to 1200° C., cooling the heated lepidolite, contacting the cooled solid lepidolite, in the presence of water, with a solid, strongly acidic cation exchange resin at a temperature from 95° to 150° C., separating the contacted lepidolite from the resin, and recovering the lithium values from the resin.

2. A process according to claim 1 wherein the heated lepidolite is contacted with the resin at a temperature in the range of 95° to 120° C. for a length of time in the range of 3 to 10 hours.

References Cited in the file of this patent

UNITED STATES PATENTS

| | | |
|---|---|---|
| 2,516,109 | Ellestad et al. | July 25, 1950 |
| 2,648,601 | Byler et al. | Aug. 11, 1953 |

OTHER REFERENCES

Kunin: "Industrial and Engineering Chemistry," vol. 42, No. 1, pages 65 to 70 (1950); vol. 45, No. 1, pages 83–88, January 1953.

Nachod et al.: "Ion Exchange Technology," Academic Press Inc., publishers, New York, 1956, page 294.

Samuelson: "Ion Exchangers in Analytical Chemistry," John Wiley and Sons, Inc., New York, page 106 (1953).

Kressman et al. in "Chemical Society Journal," 1949, Part II, pages 1190–1201.